United States Patent [19]

Loeckle

[11] Patent Number: 4,474,349
[45] Date of Patent: Oct. 2, 1984

[54] DROP MARKER SYSTEM

[76] Inventor: Vincent C. Loeckle, R.R. #1, Box 85, Osage, Iowa 50461

[21] Appl. No.: 389,628

[22] Filed: Jun. 18, 1982

[51] Int. Cl.³ ............................................. B64D 1/00
[52] U.S. Cl. ..................................... 244/136; 221/33; 116/209
[58] Field of Search ...................... 221/22, 23, 25, 33, 221/232, 226, 230; 244/137 R, 136, 1 R; 116/209, 279; 156/247, 344; 270/37

[56] References Cited

U.S. PATENT DOCUMENTS

| | | | |
|---|---|---|---|
| 550,280 | 11/1895 | Lorenz | 221/33 |
| 1,564,152 | 12/1925 | Thomson | |
| 1,985,678 | 12/1934 | Hand | |
| 2,349,984 | 5/1944 | Ostrander | |
| 2,610,868 | 9/1952 | Flament | |
| 3,280,549 | 10/1966 | Hsu | |
| 3,428,019 | 2/1969 | Tillay et al. | |
| 3,470,846 | 10/1969 | Tillay et al. | |
| 3,623,681 | 11/1971 | Ashline | |
| 3,973,513 | 8/1976 | Huwe | |
| 4,261,283 | 4/1981 | Taylor | |
| 4,270,482 | 6/1981 | Forsyth | |
| 4,300,469 | 11/1981 | Huwe | 116/209 |
| 4,316,554 | 2/1982 | Lloyd | 244/136 |

Primary Examiner—Galen L. Barefoot
Attorney, Agent, or Firm—Christensen O'Connor Johnson & Kindness

[57] ABSTRACT

A drop marker system that includes a series of interconnected drop markers that are placed into a dispensing mechanism for selective ejection to mark passes made by an aircraft is disclosed. Each drop marker includes a streamer and a substantially planar base member one end of the streamer being securely fastened to the base member. The other end of each streamer is separably fastened to the base member of the next drop marker of the series, with the streamer being folded back and forth upon itself with accordian-like folds to lay flat between the base members of the two adjacent drop markers. When a drop marker is ejected from the dispenser, the drop marker is subjected to high velocity air flowing over the dispenser, resulting in the released base member pulling on the attached streamer. The streamer unfolds due to the pulling force exerted by the released base member and because the other end of the streamer is attached to the base member of the next drop marker held in the dispenser. When the streamer is unfolded, the separably fastened end of the streamer breaks loose from the base member of the next drop marker, and the ejected drop marker falls to the ground.

9 Claims, 7 Drawing Figures

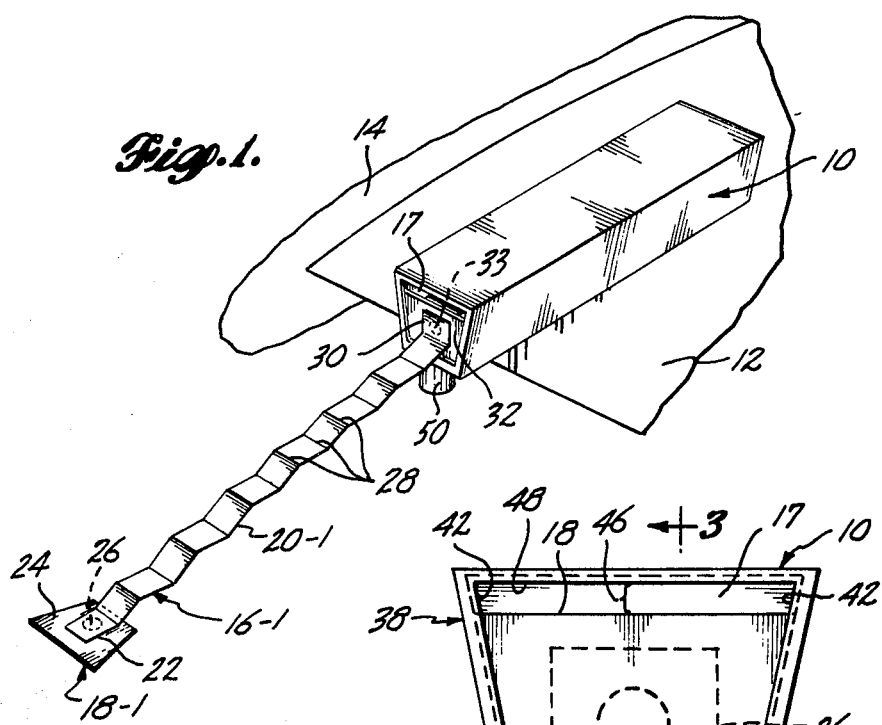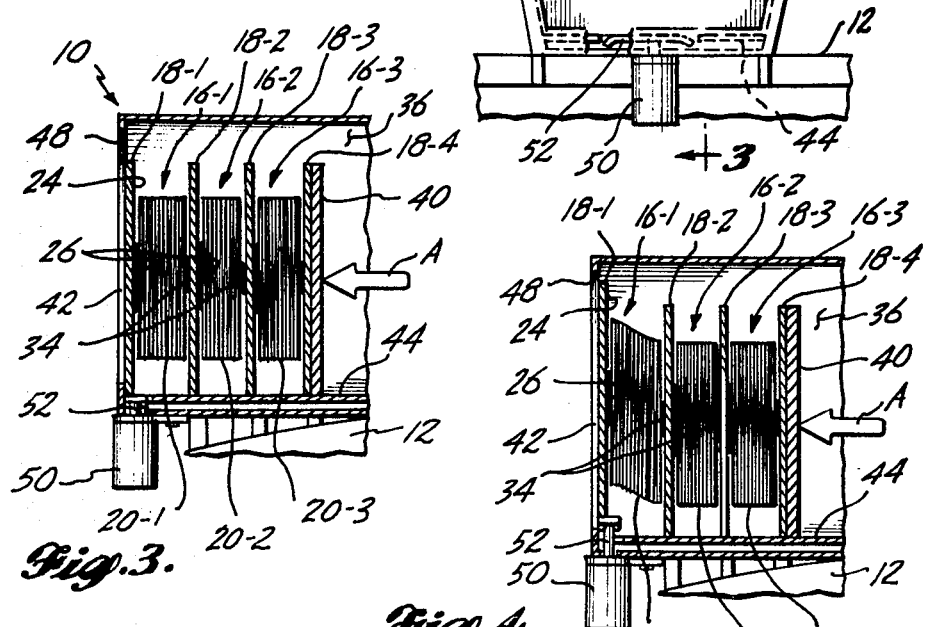

DROP MARKER SYSTEM

BACKGROUND OF THE INVENTION

This invention relates to an apparatus for selectively releasing drop markers from an aircraft so as to identify or mark a particular point along a fight path. More specifically, this invention relates to a drop marker system for aerial operations such as spraying or seeding wherein a drop marker is ejected from the aircraft at the completion of a pass across the area being treated in order to indicate the boundary of the treated area and allow the pilot to execute an additional series of passes that result in substantially continuous and uniform coverage of an intended area.

Prior art drop marker systems for operations such as aerial seeding and spraying typically utilize drop markers that are formed by a relatively long flexible streamer that extends from a heavier, generally inflexible base member. In most such prior art arrangements, the base member is fabricated of a sheet material and each drop marker is arranged into a relatively compact storage package by positioning the streamer alongside the base member in a series of accordian-like folds. See, for example, U.S. Pat. No. 3,428,019, which issued to Tillay et al. on Feb. 18, 1969. A typical prior art drop marker system is disclosed, for example, in U.S. Pat. No. 3,470,869, which issued to Tillay et al. on Oct. 7, 1969, wherein a single-file series of the folded drop markers is placed within a dispenser that is operable for ejecting a single drop marker in response to a pilot-initialed signal and is mounted on a wing or other portion of the aircraft.

When the pilot activates a system of the above-described type, a drop marker is ejected from the dispenser and passes into the relatively high velocity air that flows along the exterior of the aircraft. If the drop marker deploys properly, the heavier base member travels rearwardly in the airstream and falls downwardly to unfold the streamer and pull it into a fully extended condition prior to the time the drop marker reaches the ground. Thus, proper operation of the system provides a highly visible indicator that can be seen readily even when the area being treated is covered with crops or foilage of a fairly substantial height.

One drawback of such prior art drop marker systems is that the streamer does not always unfold to the fully extended position and the drop marker may land in a small pile that cannot be seen from the aircraft. This problem is addressed by several prior art drop markers systems, including the arrangement disclosed in Huwe, U.S. Pat. No. 3,973,513, wherein holes in the drop marker base member are intended to create air turbulance that causes the streamer to fully deploy as the base member plummets toward the ground. In another prior art proposal that is disclosed in Taylor, U.S. Pat. No. 4,261,283, the base member is configured to split into two separate pieces after release from the drop marker dispenser, with the two ends of the streamer being attached to separate pieces of the base member. In concept, the two pieces of the base member will attain spatial separation and fall to the ground with the streamer extended therebetween. Although providing a partial solution to the problem of streamer deployment, the prior art has not achieved the degree of reliability that is needed and desired in many situations in which drop markers are employed.

Another drawback that can be encountered with prior art drop marker system is that the drop markers do not always properly advance through the dispenser so that a drop marker moves into position for release as the preceding drop marker is ejected. Although air pressure and compression springs are often used to urge the stored drop markers toward the dispenser ejection mechanism, and although the drop marker base members are generally shaped to reduce frictional contact and jamming within the release mechanism, this particular problem has not been eliminated or alleviated to the desired degree.

It is therefore an object of the present invention to provide a drop marker system using drop markers with folded streamers wherein there is a high probability of the streamer unfolding as the drop marker is released from the dispenser mechanism and travels toward the ground.

It is another object of this invention to provide a drop marker and dispenser system that exhibits improved performance relative to the reliability with which drop markers advance through the dispenser and are ejected therefrom.

It is a further object of this invention to provide a drop marker system that substantially achieves the above stated objectives while being economical to fabricate and being relatively easy to operate and maintain.

SUMMARY OF THE INVENTION

These and other objects are achieved in accordance with this invention by a drop marker system which is configured and arranged so that an ejected drop marker is not free to fall toward the ground until the drop marker streamer is fully deployed. More specifically, the relatively thin, lightweight streamer of each drop marker utilized in accordance with the invention is securely attached to an associated, relatively flat base member and is positioned against the associated base member with a series of accordian-like folds in the manner known to the art. In addition, this invention employs the conventional drop marker arrangement wherein a plurality of drop markers are loaded into the drop marker dispenser as a series with the folded streamers being interspersed between the base members. Unlike prior art arrangements, the second or free end of each streamer of the drop markers of this invention is interconnected with the base member of the next most drop marker within the stack-like series. In this regard, the second end of the streamer is not securely affixed to the base member of the adjoining drop marker, but is interconnected so as to separate therefrom when the streamer is placed under a predetermined tensile force.

In operaiton, a series or row of the interconnected drop markers are loaded into a suitably configured dispenser (such as the type of dispenser disclosed in U.S. Pat. No. 3,470,846 to Tillay et al.) with the base member of the first drop marker facing the dispenser ejection opening. When the dispenser is activated, the base member of the drop marker being dispensed is ejected into the relatively high velocity air that flows past the dispenser, pulling the base member rearwardly and away from the aircraft while the simultaneously unfolding the streamer. When the streamer reaches a fully deployed condition wherein the drop marker, in effect, trails from the dispenser, a tensile force sufficient to sever the interconnection between the end of the drop marker streamer and the base member of the next most drop marker is developed. The interconnection is severed and the drop marker is then free of the dispenser and falls downwardly to the ground to mark the desired location. Since a system configured in accordance with the invention causes a dispensed drop marker to be fully deployed upon its release, yet does not substantially increase the ejection time, system reliability is increased with little or no sacrifice in the accuracy and ease of operation that has been attained with prior systems. Moreover, each time a drop marker is dispensed, it exerts a pulling force that urges the next drop marker toward and into the ejection position and thereby tends to eliminate or alleviate problems that have been encountered relative to drop markers jamming within the dispenser.

A BRIEF DESCRIPTION OF THE DRAWINGS

Other objects and advantages of the present invention will become apparent to one skilled in the art after reading the following description taken together with the accompanying drawing in which:

FIG. 1 is a perspective view that illustrates a drop marker being ejected from a drop marker dispenser unit that is mounted on the upper surface of an aircraft wing and configured in accordance with this invention;

FIG. 2 is a rear elevation view of the drop marker dispenser of FIG. 1 which indicates the storage of drop markers therein;

FIG. 3 is a sectional, side elevation view of the drop marker dispenser that is taken along the arrows 3—3 of FIG. 2 and illustrates positioning of drop markers within the dispenser units;

FIGS. 4–7 are cross-sectional elevation view of the drop marker dispenser that are identical to FIG. 3 and illustrate the deployment sequence of the invention.

DESCRIPTION OF THE PREFERRED EMBODIMENT

Figure 5:
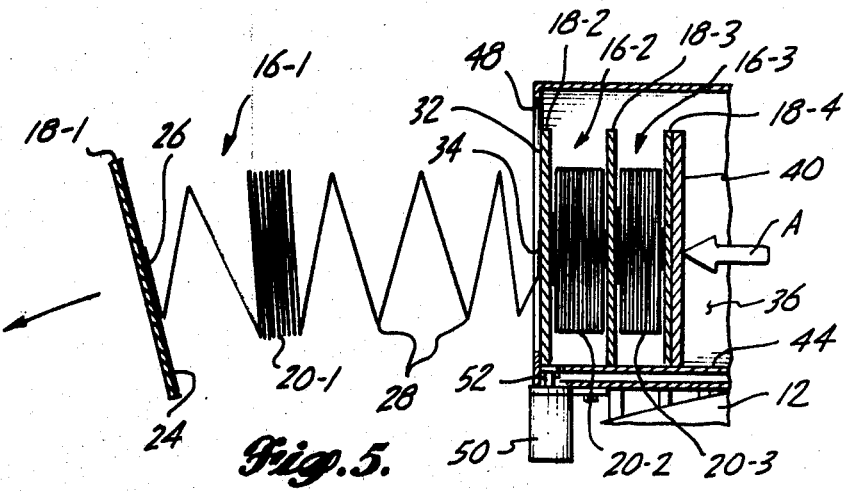

With reference to FIG. 1, a drop marker system constructed in accordance with this invention includes a box-like drop marker dispenser 10 that is mounted to an exterior portion of an aircraft (e.g. wing 12 of aircraft 14 in FIG. 1) and is configured and arranged for rearwardly directed ejection of a drop marker (generally denoted by the numeral 16), each time dispenser 10 is supplied with a suitable control signal. In this regard, FIG. 1 depicts an intermediate stage of the hereinafter described drop marker ejection and deployment sequence wherein a drop marker 16-1 extends or trails rearwardly from an ejection opening 17 that is formed in the aft portion of dispenser 10.

As is illustrated by drop marker 16-1 of FIG. 1, each drop marker 16 includes a relatively flat, relatively inflexible base member 18(18-1 in FIG. 1) and a relatively long, flexible streamer 20(20-1 in FIG. 1) having a length-to-width ratio substantially greater than unity with the first end 22 of the streamer being securely connected to an associated base member 18. Preferably, base member 18 and streamer 20 are constructed of material that is nontoxic to animals and is biodegradable. For example, currently employed embodiments of the invention utilize corrugated cardboard that is 3–4 mm. thick to form the base members 18 and utilize an 11 cm. wide, 4–6 meter long strip of tissue-like paper as the drop marker streamer.

Various alternative arrangements are generally available for securely connecting the first end 22 of a steamer 20 with its associated base member 18 so that the streamer remains attached to the base member when the drop marker is ejected form dispenser 10. For example, in the above-mentioned currently employed embodiments of the invention, the first end 22 of each paper streamer is placed in overlapping juxtaposition with a first surface 24 of the associated base member (18-1 in FIG. 1) and is bonded thereto by a rubber-base, paste-type adhesive such as rubber cement. Although the adhesive employed can be applied in numerous manners, one convenient technique is to deposit a small amount of adhesive on the central portion of the base member and press the streamer against the base member and adhesive thereby forming a generally circular bond region that is identified in the Figures by the numeral 26.

Regardless of the exact materials employed, streamer 20 includes a series of substantially parallel, accordian-like folds (28 in FIG. 1) that are spaced apart form one another by a distance that is less than the distance between the parallel edges of the trapezoidally configured base members 18. As can be seen most clearly in FIG. 3, the folds 28 facilitate efficient storage of a number of drop markers (e.g., 16-1, 16-2 and 16-3) within the interior region of dispenser 10, in that tightly folding each streamer (e.g. 20-1, 20-2 and 20-3 in FIGS. 3 through 7) causes the streamer to occupy a rectangularly shaped volume that is positioned alongside and extends outwardly form the central portion of the associated base member (18-1, 18-2 and 18-3, respectively). Thus, when a series of drop markers are placed in dispenser 10 for selective ejection therefrom, the streamers 20-1, 20-2, 20-3, . . . extend between and separate the associated base member 18-1, 18-2, 18-3, . . . from the next most base member within the stored series.

Those skilled in the art will recognize that the above-discussed construction and storage of the drop markers 16 is also used in various prior art drop marker arrangements such as those disclosed, for example, in the previously referenced patents that issued to Tillay et al. As can be seen in FIGS. 1 and 3, the series of stored drop markers 16-1, 16-2, 16-3, . . . of the invention differs significantly from the prior art arrangement in that each drop marker streamer 20 is connected to the next most succeeding drop marker base member 18 of the series of stored drop markers. More specifically, and relative to drop marker 16-1, the second end 30 of streamer 20-1 (i.e., end that is remote from base member 18-1) is fastened to the face of base member 18-2 that is not attached to streamer 20-2 of drop marker 16-2. Thus, as is shown most clearly in FIG. 3, all the drop markers of the stored series of drop markers 16 in effect have two base members, an associated base member to which the streamer 20 is securely fastened, and a second base member to which the second end 30 of the streamer is connected. It is to be noted that for all drop markers other than the last drop marker in the series, the second base member of each drop marker serves as the first or associated base member of the next drop marker within the series of drop markers. For example, in the depicted arrangement, the second end 30 of streamer 20-1 of drop marker 16-1 is connected to surface 32 of second base member 18-2, which is the base member that is securely attached to streamer 20-2 of drop marker 16-2. Also in FIG. 3, it will be seen that in the preferred embodiment of the invention, the second end 30 of the streamer of the last drop marker in the series of drop markers (drop marker 16-3 in FIG. 3) is fastened to a base member 18-4 that is not associated with another drop marker. This configuration allows the last drop marker of the series of drop markers to operate in the same manner as the preceding drop markers.

As can be readily recognized, the second end 30 of a drop marker 16-1 that is ejected by dispenser 10 must be severed or pulled away from the base member 18-2 of the drop marker 16-2 held in dispenser 10 before the ejected drop marker can fall downwardly to the ground. In the depicted arrangement, a separable bond region 34 is formed between the second end 30 of a streamer 20 and the surface 32 of the next succeeding drop marker base member 18 in a manner similar to that utilized to form the secure bond region 26 between the first end 22 of the streamer 20 and the associated base member 18. As indicated in FIG. 3, when the same type adhesive is utilized to form the secure bond region 26 and the separable bond region 34, less adhesive is utilized in bond region 34 so that bond region 34 is substantially smaller than bond region 26.

It should be recognized that alternative interconnection techniques are available for connecting the second end 30 of each streamer to the next succeeding base member 18, and that the important factor is control of the drop marker structure and construction so that streamer end 22 remains attached to its associated base member 18 while streamer end 30 breaks free of the base member of the next drop marker 16 when the drop marker is released from dispenser 10 and reaches a fully deployed condition. For example, a separable bond region 34 that exhibits the desired characteristics can be formed by utilizing an adhesive that exhibits lower bond strength than that used to form the secure bond 26 between the first end 22 of the streamer 20 and the base member 18 that is associated with that particular streamer. Moreover, it can be recognized that various other techniques can be employed to allow separation of an ejected drop marker when relatively full deployment thereof causes the streamer to pull on the base member of the next drop marker. For example, in some situations it may be desirable to utilize a severable connection such as that formed be perforating or otherwise weakening a region of streamer 20 instead of employing the previously discussed adhesive bonding techniques.

As was previously mentioned, dispenser 10 is configured and arranged for ejecting a single drop marker 16 each time a control signal is supplied by the pilot or by other control means. As was indicated in disclosing the manner in which a series or row of drop markers 16 are stowed within dispenser 10, the interior region of dispenser 10 in effect forms a channel 36 that is filled with a series of the interconnected drop markers 16. As is shown in FIG. 2, the channel 36 is substantially trapezoidal in cross-sectional geometry with the upwardly extending dispenser walls 38 being spaced apart by a distance that allows the drop marker base members 18 (and hence the drop marker 16) to be urged toward the dispener ejection opening 17 by means of a longitudinally directed force (i.e., a force exerted in the direction indicated by arrow A of FIG. 3). As is known in the art, air pressure resulting from air introduced through openings (not shown) in dispenser 10 can be utilized to urge the drop markers 16 toward the ejection opening 17. Alternatively, or in addition, other force-producing techniques can be employed within the dispenser, including one or more compression springs (not shown) to exert a force on the drop markers 16. As seen in FIG. 3, a pressure block 40 is placed in front of the last base member 18-4 of the series of drop markers 16 held in the dispenser 10. Pressure block 40 is a reusable item that is used to keep the series of drop markers pressed together and to prevent the drop markers from tipping over inside the dispenser 10. Pressure block 40 has the same trapezoidal configuration as base members 18, and thus fits within channel 36 of dispenser 10 as part of the row of drop markers 16. As mentioned previously, the second end 30 of the last drop marker streamer 20-3 is attached to the last base member 18-4 of the series of drop markers. In alternative configurations, base member 18-4 could be eliminated and the second end of the last drop marker streamer attached to pressure block 40.

With continued reference to FIG. 2, ejection opening 17 of dispenser 10 is of trapezoidal cross-sectional geometry and is constructed in a manner that prevents the rearmost drop marker 16-1 from being ejected by dispenser 10 until the sytem command signal is supplied by the pilot or by other means. In particular, ejection opening 17 of FIG. 2 is formed by substantially identical flanges 42 that project inwardly from the oppositely disposed dispenser walls 38. As previously mentioned, a group or series of drop markers 16 are loaded into channel 36 of dispenser 10 with the lower edges of the spaced apart drop marker base members resting on the lower surface 44 of channel 36 with the upwardly extending edges of the base members 18 being slightly spaced apart or barely contacting the upwardly extending walls 38 of channel 36. Thus, as is shown in both FIGS. 2 and 3, the longitudinally directed force A, which is supplied by the previously mentioned air pressure or other means, urges the series of stored drop markers 16 toward ejection opening 17 to urge base member 18-1 of drop marker 16-1 into abutment with the inner surfaces of flanges 42 and thereby position drop marker 16-1 for ejection through ejection opening 17.

In the arrangement shown in the drawings, drop marker 16-1 (and each subsequent drop marker 16) is released from dispenser 10 by pushing the base member 18-1 upwardly so that the base member passes by the flanges 42 and is ejected from the ejection opening 17 by the longitudinally-directed force A and by the air flowing along the dispenser. More specifically and with particular reference to FIGS. 2 and 4, both channel 36 and ejection opening 17 of dispenser 10 are of a height that is greater than the height of each base member 18 (i.e., the distance between the parallel boundary edges of base member 18). This dimensional relationship establishes a gap or space 46 between the upper boundary 48 of ejection opening 17 and the upper edge of a drop marker base member that is positioned for ejection (base member 18-1 in FIG. 2). Each time a command signal is supplied by the pilot or by other means, a solenoid 50 (or other conventional linear actuator) that is mounted directly below the base member of the drop marker to be ejected (base member 18-1 of drop marker 16-1 in FIGS. 3 and 4) is actuated. As is shown in FIG. 4, when the solenoid 50 is actuated, the solenoid plunger or core 52 moves upwardly to vertically displace base member 18-1 of drop marker 16-1 by an amount which allows the side edges of the base member to clear flanges 42, thereby releasing the base member 18-1.

As is shown in FIG. 5, streamer 20-1 of the ejected drop marker 16-1 begins to unfold as the relatively high velocity airflow moves base member 18-1 away from dispenser 10. When the ejected drop marker 16-1 reaches a fully extended condition (FIGS. 1 and 6), a pulling force is exerted on the separable bond region 34, causing the end 30 of streamer 20-1 to separate from the base member 18-2 of the next drop marker 16-2. The ejected drop marker 16-1 then fall downwardly to the ground. In this regard, since the ejected drop marker reaches a fully unfolded condition before breaking away from the next drop marker within dispenser 10, few cases are encountered wherein the drop marker does not land in an extended condition that can be seen from the aircraft.

Figure 6:
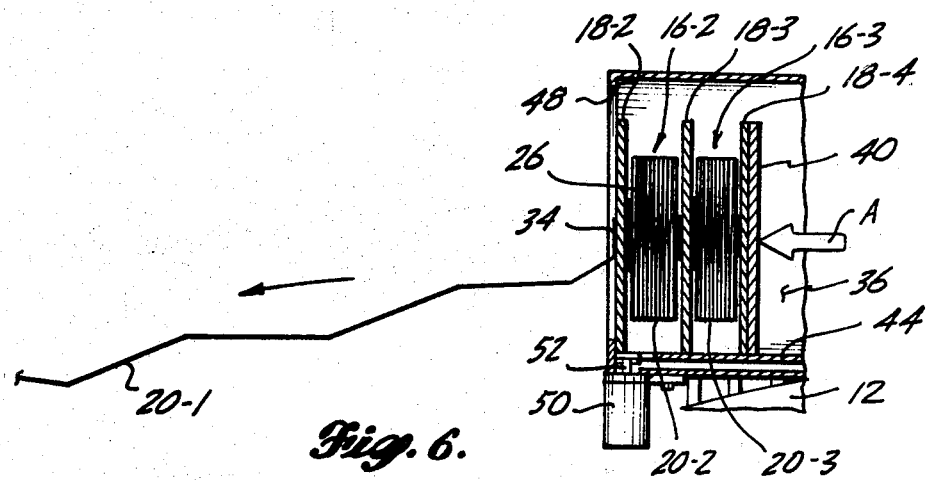
Figure 7:
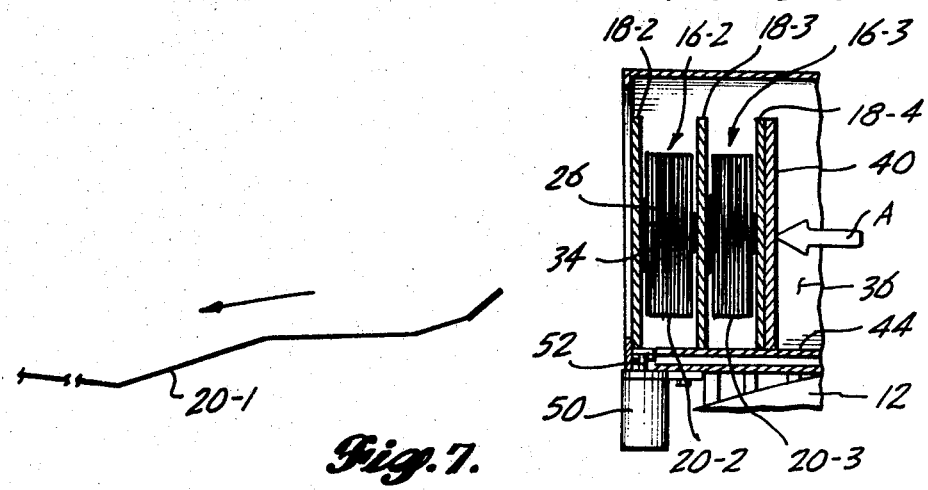

FIGS. 5 through 7 also illustrate the manner in which the invention operates to ensure that the next drop marker of the group of drop markers stored within the dispenser will move into position for ejection. In this regard and as was discussed relative to FIG. 3, the group of stowed drop markers 16 is urged rearwardly by a force A that is supplied by air pressure or other means. When the solenoid 48 is acutated to eject a drop marker 16-1, the force A tends to push the base member 18-1 through the ejection opening 17 and causes the stowed drop markers (16-2 and 16-3 in FIG. 5) to move toward the ejection opening 17. As the ejected marker 16-1 deploys (FIGS. 1 and 6), streamer 20-1 pulls on base member 18-2 of the next drop marker to supplement the force A. Because the ejected drop marker 16-1 deploys very rapidly, the streamer 20-1 in effect jerks base member 18-2 toward ejection opening 17. Such a jerking force or impulse is believed to be advantageous in overcoming any tendency of the stored drop markers 16 to jam within dispenser 10. Thus, it has been found that the practice of the invention provides relatively high operational reliability both with respect to drop marker deployment and with respect to advancement of the stowed drop markers through the dispenser 10.

The embodiments of the invention in which an exclusive property or privilege is claimed are defined as follows:

1. A drop marker system for releasing a drop marker form an aircraft, each released drop marker having a base member with an associated folded streamer that is configured to unfold when that drop marker is released from siad aircraft, said drop marker system comprising:
a drop marker dispenser mountable on said aircraft, said dispenser having an ejection opening;
at least one drop marker for use in said dispenser, each said drop marker including a first and second base member and a streamer, said streamer having a length-to-width ratio substantially greater than unity and having a first end and a second end, said base members and said streamer of each said drop marker being loaded into said dispenser with said streamer being folded back and forth upon itself with accordian-like folds between said first and said second base members, said first end of said streamer being securely fastened to said first base member and said second end of said streamer being attached to said second base member by separable interconnection means for separating when said first base member is released from said dispenser and said streamer is fully unfolded; and
means for releasing for said first base member together with said streamer from said ejection opening of said dispenser and retaining said second base member in said dispenser.

2. The drop marker system of claim 1, wherein each said base member is substantially the same size.

3. The drop marker system of claim 2, wherein each said base member is substantially planar and is of a trapezoidal geometry.

4. The drop marker system of claim 3, wherein each said base member is formed from corrugated carboard.

5. The drop marker system of claim 4, wherein said streamer is made of paper.

6. The drop marker system of claim 1, wherein said separable interconnection means comprises an adhesive layer that is interposed between said second end of each said streamer and said second base member thereof.

7. The drop marker system of claims 1, 2, or 6, wherein said system includes a plurality of drop markers for sequential release from said drop marker dispenser, said plurality of drop markers being arranged one after the other to form a single file series of drop markers, said second base member of each drop marker of said single file series other than the final drop marker therein serving as the first base member of the next drop marker within said single file series.

8. An improved drop marker for use in an aircraft drop marker system of the type wherein a series of drop markers that each include a relatively flat, relatively inflexible base member and a relatively long, relatively flexible streamer folded back and forth upon itself with accordian-like folds are stored in single file sequence within a drop marker dispenser for selective release through an ejection opening to pass into high velocity air flowing past said dispenser and unfold for downward travel to the ground, each said streamer of each said drop marker having a first end securely fastened to an associated base member, wherein the improvement comprises:
a separable interconnection formed between a second end of each said streamer and each said base member of the next drop marker in said series of drop markers, said separable interconnection configured and arranged to separate when said streamer of a released marker is fully unfolded.

9. The improved drop marker of claim 8, wherein said separble interconnection is an adhesive layer that is interposed between said second end of each said streamer and said base member of said next drop marker in said series.

* * * * *

UNITED STATES PATENT AND TRADEMARK OFFICE
CERTIFICATE OF CORRECTION

PATENT NO. : 4,474,349  Page 1 of 2

DATED : October 2, 1984

INVENTOR(S) : Vincent C. Loeckle

It is certified that error appears in the above-identified patent and that said Letters Patent is hereby corrected as shown below:

Abstract [57], Line 5, after "member" insert --with--

Column 1, line 7, "fight" should be --flight--

Column 1, line 18, "long" should be --long,--

Column 1, line 31, "initialed" should be --initiated--

Column 1, line 46, "foilage" should be --foliage--

Column 1, lines 54 & 55, "turbulance" should be --turbulence--

Column 2, line 2, "system" should be --systems--

Column 2, line 57, "Tillay et al.)" should be --Tillay et al.),--

Column 2, line 63, after "while" delete "the"

Column 3, line 33, "view" should be --views--

Column 3, line 54, "18(18-1 in FIG.1)" should be --18 (18-1 in FIG.1)--

Column 3, line 55, "20(20-1 in FIG.1)" should be --20 (20-1 in FIG.1)--

Column 4, line 2, "form" should be --from--

Column 4, line 18, "form" should be --from--

Column 4, line 28, "form" should be --from--

Column 4, line 47, after "(i.e.," insert "the"

Column 5, line 57, "dispenser" should be --dispenser--

UNITED STATES PATENT AND TRADEMARK OFFICE
CERTIFICATE OF CORRECTION

PATENT NO. : 4,474,349

DATED : October 2, 1984

INVENTOR(S) : Vincent C. Loeckle

It is certified that error appears in the above-identified patent and that said Letters Patent is hereby corrected as shown below:

Column 7, line 3, "fall" should be --falls--

Column 7, line 38, "form" should be --from--

Column 7, line 41, "siad" should be --said--

Column 8, line 5, after "releasing" delete "for"

Column 8, line 51, "separble" should be --separable--

Signed and Sealed this

Tenth Day of December 1985

[SEAL]

Attest:

DONALD J. QUIGG

Attesting Officer

Commissioner of Patents and Trademarks